(12) United States Patent
Tsuji et al.

(10) Patent No.: US 9,075,295 B2
(45) Date of Patent: Jul. 7, 2015

(54) DEVICES AND METHOD FOR STOPPING TRAPEZOIDAL DISTORTION CORRECTION DURING USER INTERACTION

(71) Applicants: Shigekazu Tsuji, Tokyo (JP); Naoto Takahashi, Kanagawa (JP)

(72) Inventors: Shigekazu Tsuji, Tokyo (JP); Naoto Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 117 days.

(21) Appl. No.: 13/644,944

(22) Filed: Oct. 4, 2012

(65) Prior Publication Data

US 2013/0107228 A1   May 2, 2013

(30) Foreign Application Priority Data

Nov. 2, 2011   (JP) ................................. 2011-241178

(51) Int. Cl.
  *G03B 21/14*   (2006.01)
  *H04N 9/31*    (2006.01)
(52) U.S. Cl.
  CPC ............ *G03B 21/147* (2013.01); *G03B 21/145* (2013.01); *H04N 9/3185* (2013.01); *H04N 9/3194* (2013.01)
(58) Field of Classification Search
  CPC .... G03B 21/14; G03B 21/147; G03B 21/145; H04N 9/31; H04N 9/3185; H04N 9/3191; H04N 9/3194
  USPC ................................ 353/69–70, 94, 121–122
  See application file for complete search history.

(56) References Cited

U.S. PATENT DOCUMENTS

| | | | | |
|---|---|---|---|---|
| 6,974,217 B2* | 12/2005 | Kimura et al. | ................... | 353/69 |
| 7,070,283 B2* | 7/2006 | Akutsu | ........................... | 353/69 |
| 7,201,482 B2* | 4/2007 | Tamura | ........................... | 353/70 |
| 7,222,972 B2* | 5/2007 | Akutsu | ........................... | 353/69 |
| 7,270,421 B2* | 9/2007 | Shinozaki | ........................ | 353/69 |
| 8,451,381 B2* | 5/2013 | Kaise et al. | ................... | 348/607 |
| 2003/0223048 A1* | 12/2003 | Kimura | ........................... | 353/70 |
| 2004/0041985 A1 | 3/2004 | Kimura et al. | | |
| 2004/0201594 A1* | 10/2004 | Nashida et al. | ............... | 345/647 |
| 2005/0231691 A1* | 10/2005 | Li | .................................... | 353/69 |

(Continued)

FOREIGN PATENT DOCUMENTS

| CN | 1445987 A | 10/2003 |
|---|---|---|
| CN | 101382595 A | 3/2009 |

(Continued)

OTHER PUBLICATIONS

Chinese Office Action dated Jul. 28, 2014 for corresponding Chinese Application No. 201210441078.8.

*Primary Examiner* — Jori S Reilly-Diakun (74) *Attorney, Agent, or Firm* — Harness, Dickey & Pierce, P.L.C.

(57) ABSTRACT

A projector device, a method of correcting trapezoidal distortion, and a distortion correction program stored in a recording medium are provided, each of which projects an image onto a projection surface, detects inclination of the projector device with respect to a horizontal surface to output an inclination angle value of the projector device, corrects trapezoidal distortion in an image to be projected based on the inclination angle value, determines whether an operation device of the projector device is being operated by a user to generate a determination result, and prohibits the projector device from performing trapezoidal distortion correction when the determination result indicates that the operation device is being operated by the user.

13 Claims, 5 Drawing Sheets

(56) References Cited

U.S. PATENT DOCUMENTS

| | | | |
|---|---|---|---|
| 2006/0256298 A1* | 11/2006 | Knipe | 353/69 |
| 2009/0059183 A1 | 3/2009 | Tejima | |
| 2009/0122275 A1* | 5/2009 | Nagashima et al. | 353/85 |
| 2010/0103385 A1* | 4/2010 | Kubota | 353/70 |
| 2010/0103386 A1* | 4/2010 | Kubota | 353/70 |
| 2010/0165302 A1* | 7/2010 | Ozawa | 353/70 |
| 2011/0181846 A1* | 7/2011 | Ozawa | 353/70 |
| 2013/0083298 A1* | 4/2013 | Yoshimura et al. | 353/69 |

FOREIGN PATENT DOCUMENTS

| | | |
|---|---|---|
| CN | 102183870 A | 9/2011 |
| CN | 202014331 U | 10/2011 |
| JP | 2003-029714 | 1/2003 |
| JP | 2003-283963 | 10/2003 |
| JP | 2005-079939 | 3/2005 |
| JP | 2010-154168 | 7/2010 |

\* cited by examiner

DEVICES AND METHOD FOR STOPPING TRAPEZOIDAL DISTORTION CORRECTION DURING USER INTERACTION

CROSS-REFERENCE TO RELATED APPLICATIONS

This patent application is based on and claims priority pursuant to 35 U.S.C. §119 to Japanese Patent Application No. 2011-241178, filed on Nov. 2, 2011, in the Japan Patent Office, the entire disclosure of which is hereby incorporated herein by reference.

BACKGROUND

1. Field

The present invention generally relates to a projector device capable of correcting trapezoidal distortion in an image to be projected, a method of correcting trapezoidal distortion in an image to be projected, and a recording medium storing a distortion correction program.

2. Background

The recent projector devices are provided with a keystone distortion correction function, which corrects trapezoidal distortion in an image to be projected. For example, the projector device detects an inclination angle of the projector device using an accelerometer, corrects trapezoidal distortion in the image based on the detected inclination angle, and projects the corrected image on a screen. The accelerometer does not only detect static acceleration due to gravity, but also detects dynamic acceleration due to vibration or shock. For this reasons, even when a table on which the projector device is provided vibrates even slightly, the projector device performs distortion correction. This may sometimes lower the quality of the projection image being displayed on the screen, as the projection image is constantly updated.

In view of this, Japanese Patent Application Publication No. JP 2005-79939-A obtains the output signal of an accelerometer for a plurality of times, and corrects trapezoidal distortion based on the value of output signal that occurs most frequently, thus reducing the number of times the projector device performs distortion correction.

SUMMARY

The projector device disclosed in Japanese Patent Application Publication No. JP 2005-79939-A corrects trapezoidal distortion based on the value of output signal that occurs most frequently, irrespective of the cause of a vibration. For example, the projector device is provided with an operation device, for example, at the upper surface of the projector device to allow a user to input a user instruction through a key or a switch. As the user operates the operation device of the projector device, the projector device may be slightly vibrated such that the accelerometer may detect such vibration. For example, especially when the accelerometer and the operation device are mounted on the same board, the accelerometer may output an inclination angle of the projector device as large as one degree. Accordingly, the projector device performs distortion correction based on this inclination angle, such that it may degrade image quality of the projection image as distortion correction is performed more than it is needed.

In view of the above, one aspect of the present invention is to provide a projector device, which determines whether the operation device of the projector device is being operated by the user to generate a determination result, and prohibits the projector device from performing distortion correction when the determination result indicates that the operation device is being operated by the user.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
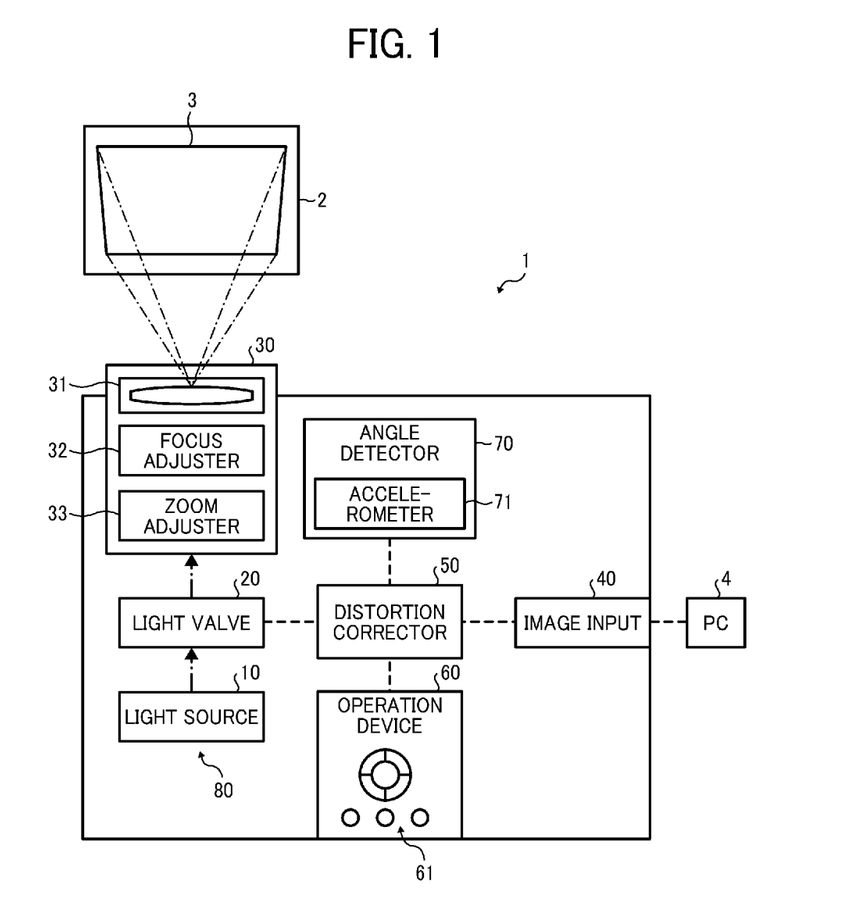
FIG. 1 is a schematic block diagram illustrating a structure of a projector device, according to an example embodiment of the present invention.

Referring to FIG. 1, a structure of a projector device 1 is explained according to an example embodiment of the present invention. The projector device 1 of FIG. 1 projects an image using the liquid crystal display (LCD) technology. Alternatively, the projector device 1 of FIG. 1 may use any desired projection technologies including digital light processing (DLP) technology using one or more digital micro minor devices (DMDs).

The projector device 1 includes a projector 80, an image input 40, a distortion corrector 50, an operation device 60, and an angle detector 70.

The projector 80 includes a light source 10, a LCD light valve ("light valve") 20, and a projection optical system 30. The light source 10 is provided with a lamp, and a light polarizing element that converts light irradiated from the lamp to linear polarized light. The lamp may be implemented by, for example, a halogen lamp. The other examples of lamp include, but not limited to, metal halide lamp, high-pressure mercury lamp, laser, and light emitting diode (LED).

The light valve 20 is provided with an image forming section 21 (FIG. 2). The light valve 20 forms an image 22 on the image forming section 21, based on information output from the distortion corrector 50. Unless the image is corrected at the distortion corrector 50, the light valve 20 forms the image 22 on the image forming section 21 based on image data input by the image input 40.

The projection optical system 30 includes a lens system 31, a focus adjuster 32, and a zoom adjuster 33. The focus adjuster 32 adjusts the focus of a projection image 3 displayed on a screen 2. The zoom adjuster 33 enlarges or reduces the size of the projection image 3 displayed on the screen 2 by zooming in or out.

The light irradiated from the light source 10 is directed to the image 22 on the image forming section 21, as the light passes the image forming section 21 of the light valve 20. The projection optical system 30 projects the image 22, which is irradiated with the light, toward the outside to display the image 22 as the projection image 3 on the screen 2. The projector 80 projects the projection image 3 on the screen 2, which is substantially perpendicular with respect to the floor or the ceiling of a room where the projector device 1 is provided.

The image input 40 inputs the image data output from an image output device such as a personal computer (PC) 4. The other examples of the image output device include, but not limited to, a DVD player, video player, and television. Alternatively, the image input 40 may input image data, which is received through a network.

The distortion corrector 50 is implemented by processor. The processor includes a central processing unit (CPU), a read only memory (ROM) that stores various control programs, a random access memory (RAM) that temporarily stores data, a backup memory, an input port, and an output port.

In this example, the ROM stores a control program that causes the distortion corrector 50 to execute operation of correcting geometric distortion such as trapezoidal distortion in an image. The CPU deploys the distortion correction control program stored in the ROM onto the RAM functioning as a work memory area to perform various operations including adjusting a correction amount based on angle information input by the angle detector 70 or an instruction obtained through the operation device 60, and correcting distortion in the image input by the image input 40.

The distortion corrector 50 corrects trapezoidal distortion in the projection image 3 to be displayed or being displayed on the screen 2, based on an inclination angle "X" of the projector 80 that is detected by the accelerometer 71. The accelerometer 71 is capable of detecting the inclination angle of the projector 80 in the up or down directions with respect to a horizontal surface. For example, the distortion corrector 50 obtains an inclination angle value X that is detected by the accelerometer 71 once every 100 milliseconds.

Figure 2A:
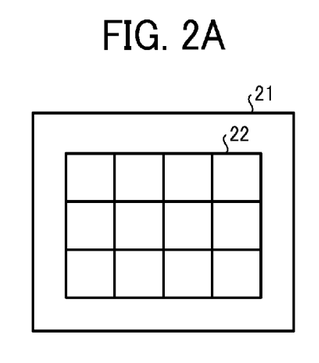
FIG. 2A is an illustration of an image formed on an image forming section of a light valve of the projector device of FIG. 1.
Figure 2B:
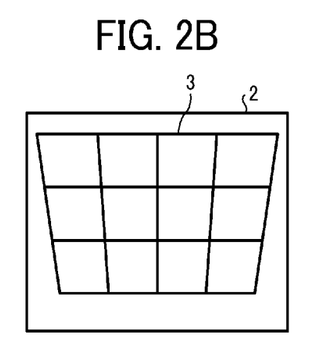
FIG. 2B is an illustration of a projection image displayed on a screen based on the image of FIG. 2A, which is distorted.
Figure 2C:
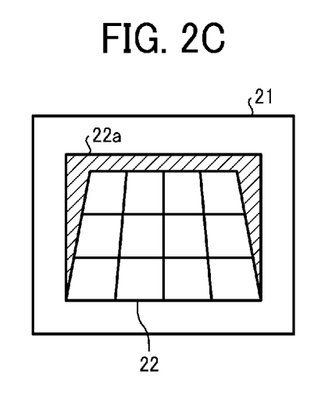
FIG. 2C is an illustration of a corrected image formed on the image forming section of the light valve of the projector device of FIG. 1.
Figure 2D:
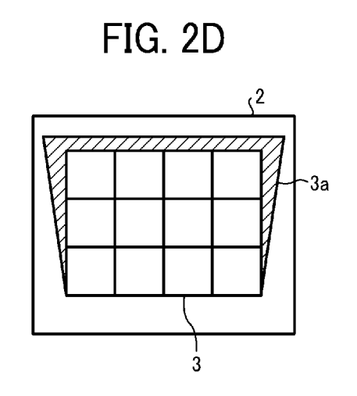
FIG. 2D is an illustration of a projection image displayed on the screen based on the corrected image of FIG. 2C.

As illustrated in FIG. 2A, it is assumed that the image 22 having a rectangular shape is formed on the image forming section 21 of the light valve 20. Unless the image 22 is corrected, the resultant projection image 3 would be distorted so as to have a trapezoidal shape as illustrated in FIG. 2B based on the inclination of the projector device 1. To correct distortion in the projection image 3, as illustrated in FIG. 2C, the distortion corrector 50 sets a border section 22a (hatched area) of the image 22 formed on the image forming section 21 of the light valve 20 to black colors, based on the inclination angle of the projector device 1. When the image 22 is projected onto the screen 2, as illustrated in FIG. 2D, the border section 22a of the image 22 is displayed as a border section 3a of the projection image 3, in black color. The rest of the projection image 3, from which the border section 22a is removed, is displayed in color based on the original image. Since the border section 3a is displayed in black, the user is most likely to think that the projection image 3 is in rectangular shape.

In this example, when the detected inclination angle X of the projector 80 has a value greater than the minimum angle value α, the distortion corrector 50 performs distortion correction. More specifically, when the detected inclination angle X of the projector device 1 is greater than the minimum angle value α, the distortion corrector 50 corrects distortion in the projection image 3. The minimum angle value α is previously determined depending on a projection distance L0 of the projector device 1.

Figure 5A:
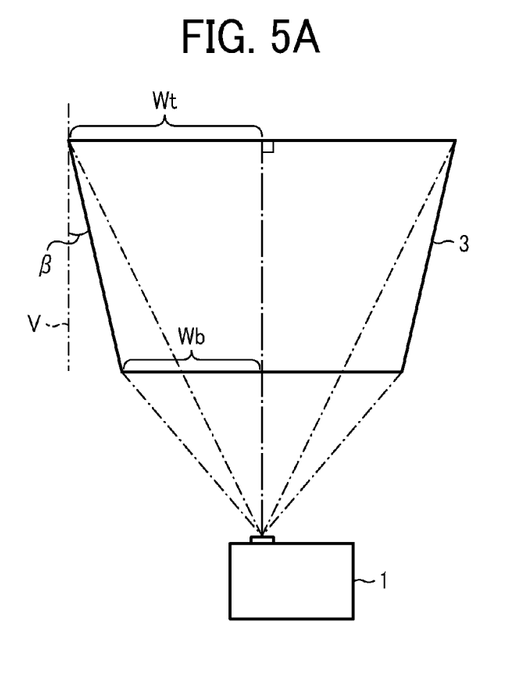
FIGS. 5A and 5B are an illustration for explaining the relationship between a minimum angle and a projection distance of the projector device of FIG. 1, using a projection image displayed on the screen.
Figure 5B:
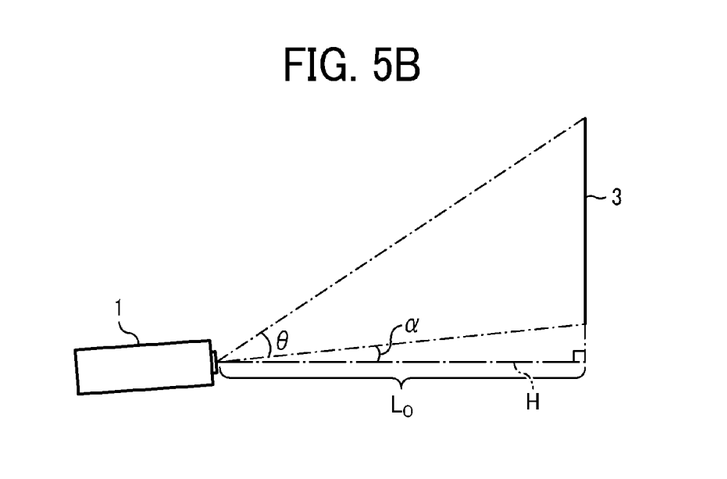

For example, as illustrated in FIG. 5B, the projector 80 is tilted at a slight angle even when the projector device 1 is provided at a horizontal surface. In order to detect inclination of the projector 80 with respect to a horizontal surface, the minimum angle value needs to be taken into account in addition to a projection angle θ of the projector 80.

As illustrated in FIGS. 5A and 5B, the distortion corrector 50 may calculate the minimum angle value α of the detected inclination angle X that defines an inclination angle value subjected for distortion correction, using the following equation.

$$\tan\beta = (Wt - Wb)/(L0*(\tan(\theta+\alpha)-\tan\alpha))$$

In FIG. 5A, the line "V" indicates a vertical line, or substantially a vertical line. In FIG. 5B, the line "H" indicates a horizontal line, or substantially a horizontal line. In the equation, α denotes the minimum angle value of inclination angle X that defines an inclination angle value subjected for distortion correction (FIG. 5B). β denotes the distorted angle of the projection image 3, which reflects the degree of distortion in the projection image 3 (FIG. 5A). Wt denotes a half of the upper side length of the projection image 3 (FIG. 5A). Wb denotes a half of the lower side length of the projection image 3 (FIG. 5A). θ denotes a projection angle of the projector 80 in the projector device 1 (FIG. 5B). L0 denotes a projection distance of the projector device 1, which is obtained as a distance between the projector 80 and the projection image 3 (FIG. 5B).

For example, it is assumed that distortion correction in the projection image 3 needs to be performed, in case the ratio (Wt/Wb) between the upper side 2Wt and the lower side 2Wb is 1% or greater. In such case, the distorted angle β of the projection image 3 is about 0.5 degrees. In case the projection distance L0 is 400 mm, the minimum angle value α for β=0.5 degrees is about 0.3 degrees. In case the projection distance L0 is 1200 mm, the minimum value angle α for β=0.5 is about 0.7 degrees.

The distortion corrector 50 further detects an operation state of the operation device 60 to determine whether the operation device 60 is being operated by the user. In one example, the distortion corrector 50 determines that the operation device 60 is being operated by the user when any one of the keys has changed its state, such as from the off-state to the on-state, or from the on-state to the off-state. When it is determined that the operation device 60 is being operated by the user, the distortion corrector 50 does not perform distortion correction on the projection image 3.

The distortion corrector 50 is further provided with a waiting time period timer, which counts a timer value to be used for indicating a waiting time period. The waiting time period timer may be turned on or off according to an instruction of the distortion corrector 50. Further, the on or off state of the waiting time period timer is reflected to the on or off state of a waiting time period timer flag stored in a memory of the distortion corrector 50. The distortion corrector 50 is able to determine whether the waiting time period timer is in the on state or off state, based on the value of waiting time period timer flag.

The distortion corrector 50 starts counting a timer value for a waiting time period by starting the waiting time period timer when it is determined that the user completes operating the operation device 60. In this manner, when it is determined that the operation device 60 is being operated by the user, the distortion corrector 50 stops performing distortion correction operation for a predetermined waiting time period, which is previously set. The predetermined waiting time period may be set, for example, at 2 seconds.

As illustrated in FIG. 1, the operation device 60 is provided with a power switch and various adjuster keys 61, which are respectively formed on the upper surface of the projector device 1. The adjuster keys 61 include, for example, a zoom key for zooming in or out the projection image 3, a correction key for instructing distortion correction of the projection image 3, and a focus key for focusing the projection image 3.

In alternative to or addition to automatically correcting distortion using the distortion corrector 50, the projector device 1 may correct distortion in the image according to a user instruction. For example, after distortion in the projection image 3 is automatically corrected by the distortion corrector 50, the user may manually adjust the projection image 3 through the operation device 60 provided on the surface of the projector device 1. The operation device 60 may be remotely controlled using a remote controller.

The angle detector 70 is provided with the accelerometer 71. The accelerometer 71 detects an inclination angle of the projector device 1, which indicates the degree of tilt of the projector 80 with respect to the horizontal surface. The angle detector 70 obtains inclination angle information regarding the inclination angle detected by the accelerometer 71, and outputs the inclination angle information to the distortion corrector 50. In this example, the accelerometer 71 has a resolution capability, which is set at an angle smaller than the minimum angle value α, such as at 0.1 degrees.

Further, in this example, the accelerometer 71 is implemented by an analog single-axis accelerometer, which outputs a voltage that is proportional to acceleration. Alternatively, the accelerometer 71 may be provided with any desired number of detection axis such as two or three axes, or may output the detection result in any other form such as in digital form based on the duty cycle.

Figure 3A:
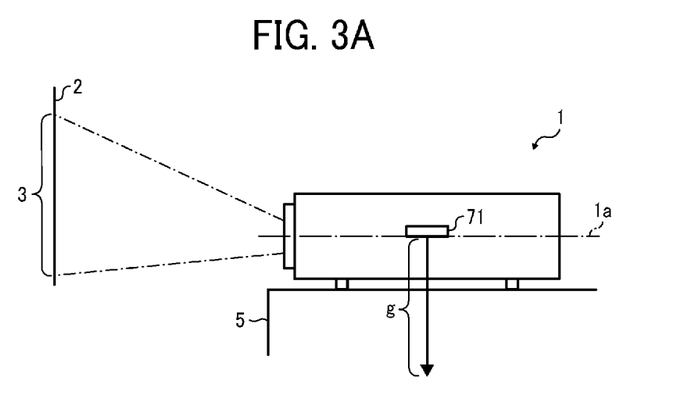
FIG. 3A is an illustration for explaining operation of detecting an inclination angle of the projector device of FIG. 1, when the projector device of FIG. 1 is provided in substantially perpendicular with respect to a horizontal surface.
Figure 3B:
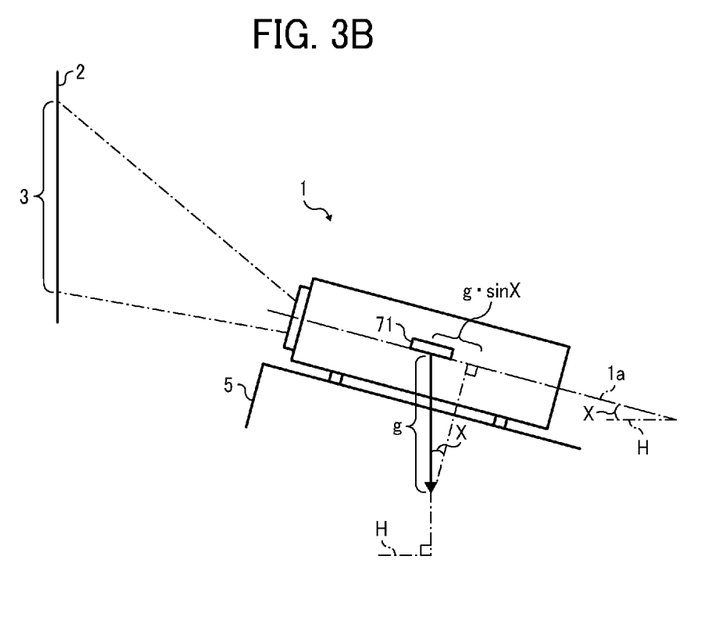
FIG. 3B is an illustration for explaining operation of detecting an inclination angle of the projector device of FIG. 1, when the projector device of FIG. 1 is inclined with respect to the horizontal surface.

As illustrated in FIGS. 3A and 3B, the accelerometer 71 is incorporated in the inner body of the projector device 1. The accelerometer 71 detects acceleration that acts along the axis 1a of the projector device 1. The axis 1a runs horizontally through the body of the projector device 1.

More specifically, referring to FIG. 3A, when the upper surface of the table 5 at which the projector device 1 is provided is horizontal, gravitational acceleration "g" acts on the accelerometer 71 in a direction that is downward along the substantially vertical direction. Since there is no acceleration that acts along the axis 1a, the accelerometer 71 outputs the "0" value as the inclination angle information.

Referring to FIG. 3B, when the upper surface of the table 5 at which the projector device 1 is provided is tilted with respect to the horizontal line H, the projector device 1 projects the projection image 3 while facing upward. Assuming that the inclination angle of the projector device 1 is X degrees with respect to the horizontal line H, an acceleration component that acts on the back portion of the projector device 1 is g*sin X. The accelerometer 71 outputs a voltage that is proportional to the acceleration component. The angle detector 70 detects an inclination angle of the projector device 1, based on the voltage output from the accelerometer 71.

Figure 4:
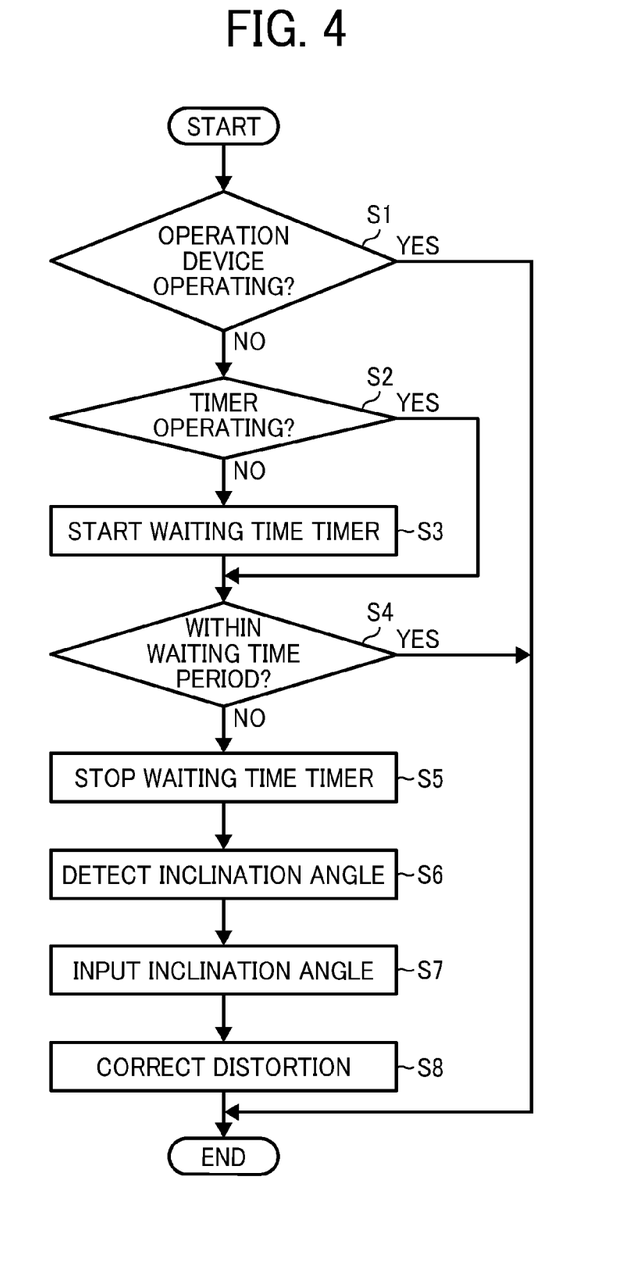
FIG. 4 is a flowchart illustrating operation of correcting trapezoidal distortion in an image, performed by the projector device of FIG. 1, according to an example embodiment of the present invention.

Referring now to FIG. 4, operation of correcting trapezoidal distortion in the image to be projected, performed by the projector device 1, is explained according to an example embodiment of the present invention.

As described above, the distortion corrector 50 previously calculates the minimum angle value α that defines an inclination angle value subjected for distortion correction, using the equation: $\tan\beta=(Wt-Wb)/(L0*(\tan(\theta+\alpha)-\tan\alpha))$. The minimum angle value α is stored in a memory such as the RAM of the processing functioning as the distortion corrector 50.

At S1, the distortion corrector 50 detects an operation state of the operation device 60 to determine whether the operation device 60 is in operation. More specifically, in this example, the operation device 60 is in operation when the operation device 60 is receiving a user instruction as the user operates the operation device 60. For example, the distortion corrector 50 may determine whether there is any signal that is output by the operation device 60, which indicates the user input to the operation device 60. When it is determined that the operation device 60 is in operation ("YES" at S1), the operation ends without performing distortion correction. When it is determined that the operation device 60 is not in operation ("NO" at S1), the operation proceeds to S2.

More specifically, when it is determined that the operation device 60 is in operation, the distortion corrector 50 is prohibited from performing trapezoidal distortion correction such that operation of trapezoidal distortion correction is stopped.

At S2, the distortion corrector 50 determines whether the waiting time period timer ("waiting time timer") is in operation such that a timer value is counted. For example, the distortion corrector 50 refers to the value of waiting time period timer flag to determine whether the waiting time period timer is in operation.

When it is determined that the waiting time period timer is not in operation ("NO" at S2), the operation proceeds to S3 to start counting a timer value for a waiting time period by executing the waiting time period timer. When it is determined that the waiting time period timer is in operation ("YES" at S2), the operation proceeds to S4.

At S4, the distortion corrector 50 determines whether the counted timer value of the waiting time period timer is within a predetermined timer value. In this example, the predetermined timer value is set at 2 seconds. When it is determined that the counted timer value of the waiting time period timer is equal to or less the predetermined timer value, the operation ends without performing distortion correction. More specifically, when it is determined that the timer value is within the predetermined timer value, the distortion corrector 50 is prohibited from performing trapezoidal distortion correction such that operation of trapezoidal distortion correction is stopped.

When it is determined that the timer value for the waiting time period exceeds the predetermined timer value ("NO" at S4), the operation proceeds to S5 to stop counting the counter timer value, by stopping the waiting time period timer. The distortion corrector 50 starts or resumes distortion correction operation.

At S6, the angle detector 70 detects an inclination angle X of the projector 80 of the projector device 1 using the accelerometer 71, under control of the distortion corrector 50. For example, the distortion corrector 50 may instruct the angle detector 70 to send inclination angle information.

At S7, the angle detector 70 inputs the detected inclination angle value X to the distortion corrector 50.

At S8, the distortion corrector 50 corrects trapezoidal distortion in the image to be projected based on the input inclination angle value X. For example, the distortion corrector 50 corrects the image 22 formed on the image forming section 21 of the light valve 20 using any desired known technique.

As described above, the distortion corrector 50 is prohibited from performing distortion correction on the projection image 3 when the operation device 60 is in operation. Further, the distortion corrector 50 is prohibited from performing distortion correction on the projection image 3 for the predetermined waiting time period after the user completes operating the operation device 60. Accordingly, the projector device 1 does not repeat operation of correction distortion in the image to be projected even when a small vibration occurs due to user's input to the operation device 60. This suppresses degradation in image quality of the projection image 3, which may be otherwise caused by repeating operation of correction distortion more than it is needed.

For example, as the user presses one of the keys of the operation device 60, the projector 80 of the projector device 1 may be slightly vibrated as a force is exerted on a circuit board or a casing of the projector device 1. By prohibiting distortion correction for a waiting time period that is counted from the time after the user ends operating the operation device 60, the projector device 1 does not correct distortion that may be caused due to the user input to the operation device 60. After the waiting time period elapses, the distortion corrector 50 performs operation of correcting distortion in the projection image such that the image quality of the projection image 3 is kept at a sufficient level.

In this example, the waiting time period is set at 2 seconds. Alternatively, any desired value greater than 0 may be set. The waiting time period may be preferably set at 1 to 3 seconds, and more preferably set at 2 seconds.

Further, in alternative to setting the waiting time period in which distortion correction is prohibited, no waiting time period may be set. For example, when the distortion corrector 50 determines that the operation device 60 is not in operation, that is, when the user input to the operation device 60 completes, the distortion corrector 50 may perform distortion correction based on a detection result of the accelerometer 71. For example, the projector device 1 may be made of material that hardly vibrates even when there is user input to the operation device 60. In such case, the distortion corrector 50 may be programmed to perform distortion correction when the operation device 60 is not in operation. This may simplify operation of controlling distortion correction.

Further, the minimum angle value $\alpha$ is obtained using the equation: $\tan\beta=(Wt-Wb)/(L0*(\tan(\theta+\alpha)-\tan\alpha))$, such that the minimum angle value $\alpha$ is set based on the projection distance L0. This further suppresses degradation in image quality of the projection image 3, irrespective of the value of projection distance L0. In case of a very short-focal length projector having the projection distance L0 of 0 to 800 mm, or a short-focal length projector having the projection distance L0 of 800 to 1200 mm, the projection angle $\theta$ is greatly influenced by the value of projection distance L0. Accordingly, especially when the very short-focal length projector or the short-focal length projector is used, controlling distortion correction using the minimum angle value $\alpha$ as described above can further improve the image quality of the projection image 3.

In this example, the inclination angle X is detected once every 100 milliseconds. For example, any desired sampling time period or detection frequency may be used. The detection frequency of the inclination angle X may be preferably set at 50 to 200 milliseconds, and more preferably set at 100 milliseconds.

Further, in this example, the LCD light valve 20 is used to project an image. Alternatively, the projector device 1 may use any other desired projection technology such as the DLP technology using the DMDs. When the DLP is used, the white light that is irradiated from a lamp is collected at a lens system to be directed to the DMDs. The light that passes through the respective mirrors of the DMDs having the on-state is enlarged at a lens system and projected onto the screen.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a projector device including a projector that projects an image onto a screen that is substantially vertical; an accelerometer that detects inclination of the projector in the upward or downward direction with respect to a horizontal surface; a distortion corrector that corrects trapezoidal distortion in an image to be projected onto the screen based on an inclination angle of the projector that is detected by the accelerometer; and an operation device that receives a user input. The distortion corrector is prohibited from performing distortion correction when the operation device is being operated by the user.

With the above-described structure, the distortion correction does not automatically perform distortion correction when the operation device is being operated by the user. This reduces a number of times the trapezoidal distortion correction is performed, thus suppressing lowering of image quality of the projection image.

What is claimed is:

1. A projector device comprising:
a projector configured to project an image onto a projection surface;
an accelerometer configured to detect an inclination of the projector with respect to a horizontal surface to output an inclination angle value of the projector;
a processor configured to correct trapezoidal distortion in the image based on the inclination angle value detected by the accelerometer; and
an operation device including at least one key that is configured to receive a user instruction from a user, wherein the processor is further configured to
determine whether the operation device is being operated by the user based on a change in state of the at least one key to generate a determination result,
stop performing trapezoidal distortion correction when the determination result indicates that the operation device is being operated by the user,
start counting a time period from the time when the user completes operating the operation device to output a counted timer value,
determine whether the counted timer value reaches a desired timer value, and
start operation of trapezoidal distortion correction when the counted timer value reaches the desired timer value.

2. The projector device of claim 1, wherein the desired timer value is set at a value between 1 to 3 seconds.

3. The projector device of claim 1, wherein the at least one key includes one or more of a zoom key, a distortion correction key, and a focus key.

4. A method of correcting trapezoidal distortion in an image to be projected by a projector device, the method comprising:
projecting an image onto a projection surface;
detecting an inclination of the projector device with respect to a horizontal surface to output an inclination angle value of the projector device;
correcting trapezoidal distortion in the image based on the inclination angle value;
determining whether an operation device of the projector device is being operated by a user based on a change in, state of at least one key of the operation device to generate a determination result;
prohibiting the projector device from performing the operation of correcting trapezoidal distortion when the determination result indicates that the operation device is being operated by the user;
starting counting a time period from the time when the user completes operating the operation device to output a counted timer value;
determining whether the counted timer value reaches a desired timer value: and
instructing the projector device to perform the operation of correcting trapezoidal distortion when the counted timer value reaches the desired timer value.

5. The method of claim 4, wherein the desired timer value is set at a value between 1 to 3 seconds.

6. The method of claim 4, wherein the at least one key includes one or more of a zoom key, a distortion correction key, and a focus key.

7. A non-transitory recording medium storing a plurality of instructions which, when executed by a processor, cause the processor to perform a method of correcting trapezoidal distortion in an image to be projected by a projector device, the method comprising:
projecting an image onto a projection surface;
detecting an inclination of the projector device with respect to a horizontal surface to output an inclination angle value of the projector device;
correcting trapezoidal distortion in the image based on the inclination angle value;
determining whether an operation device of the projector device is being operated by a user based on a change in state of at least one key of the operation device to generate a determination result;
prohibiting the projector device from performing the operation of correcting trapezoidal distortion when the determination result indicates that the operation device is being operated by the user;
starting counting a time period from the time when the user completes operating the operation device to output a counted timer value;
determining whether the counted timer value reaches a desired timer value; and
instructing the projector device to perform the operation of correcting trapezoidal distortion when the counted timer value reaches the desired timer value.

8. The non-transitory recording medium of claim 7, wherein the at least one key includes one or more of a zoom key, a distortion correction key, and a focus key.

9. A projector device comprising:
a processor configured to correct trapezoidal distortion in an image based on an inclination angle value detected by an accelerometer associated with the projector device, the inclination angle value indicating an inclination of the projector device; and
an operation device including at least one key that is configured to receive a user instruction from a user, wherein the processor is further configured to
determine whether the operation device is being operated by the user based on a change in state of the at least one key to generate a determination result,
stop performing trapezoidal distortion correction when the determination result indicates that the operation device is being operated by the user,
start counting a time period from the time when the user completes operating the operation device to output a counted timer value,
determine whether the counted timer value reaches a desired timer value, and
start operation of trapezoidal distortion correction when the counted timer value reaches the desired timer value.

10. The projector device of claim 9, further comprising:
a projector configured to project the image onto a projection surface.

11. The projector device of claim 10, further comprising:
an accelerometer configured to detect an inclination of the projector with respect to a horizontal surface to output the inclination angle value of the projector.

12. The projector device of claim 9, wherein the desired timer value is set at a value between 1 to 3 seconds.

13. The projector device of claim 9, wherein the at least one key includes one or more of a zoom key, a distortion correction key, and a focus key.

* * * * *